Figure 8:
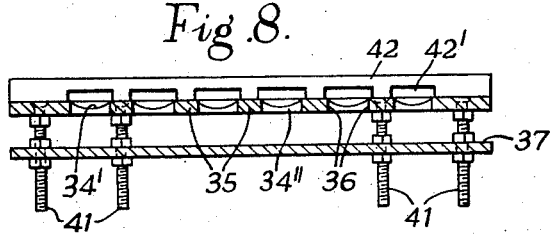

Dec. 9, 1958     E. E. BAILEY     2,863,552
APPARATUS FOR DELIVERING ARTICLES WITH
A PREDETERMINED ORIENTATION
Filed Sept. 9, 1954     4 Sheets-Sheet 1
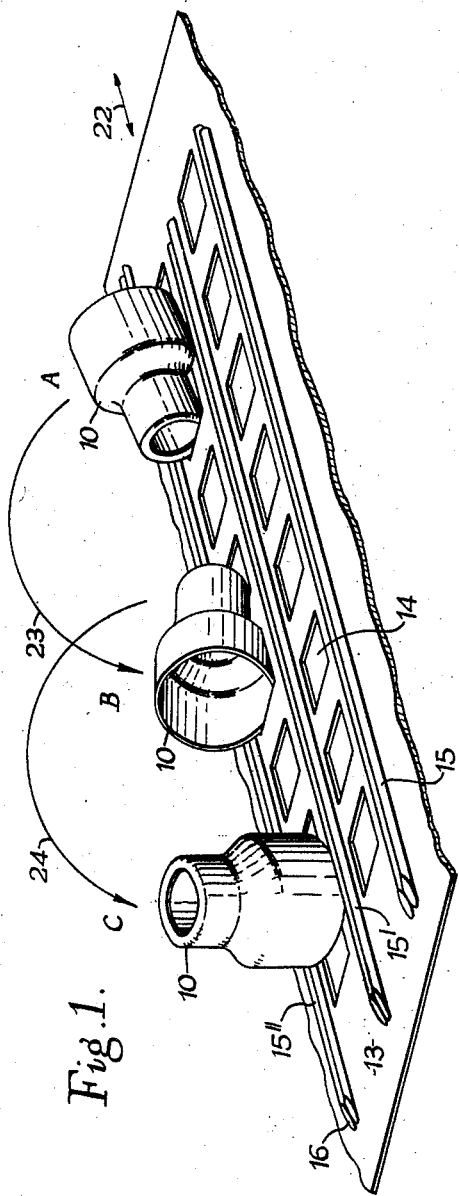
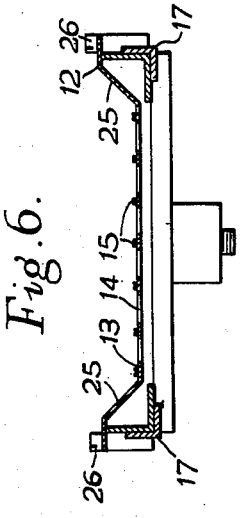
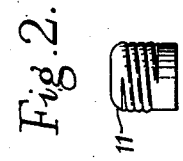
*INVENTOR*
EDWARD ERNEST BAILEY
BY *Lawrence Burns*
*ATTORNEY*

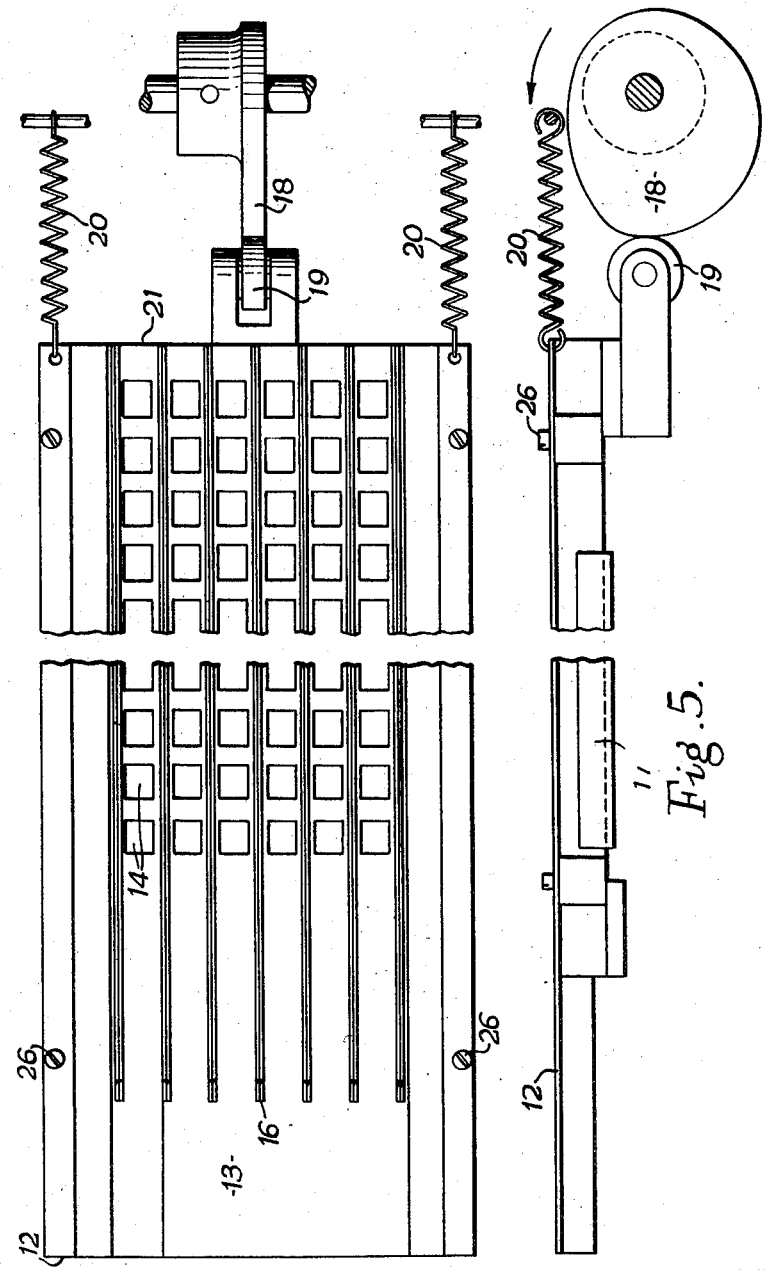

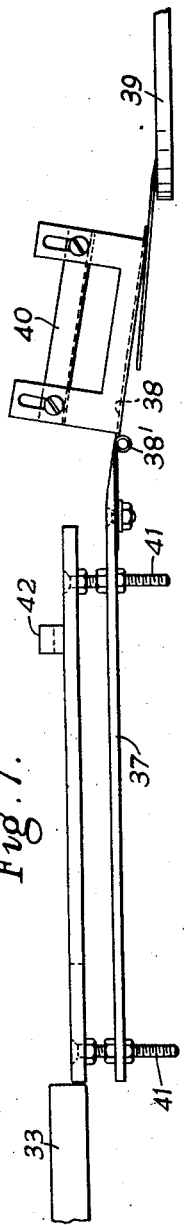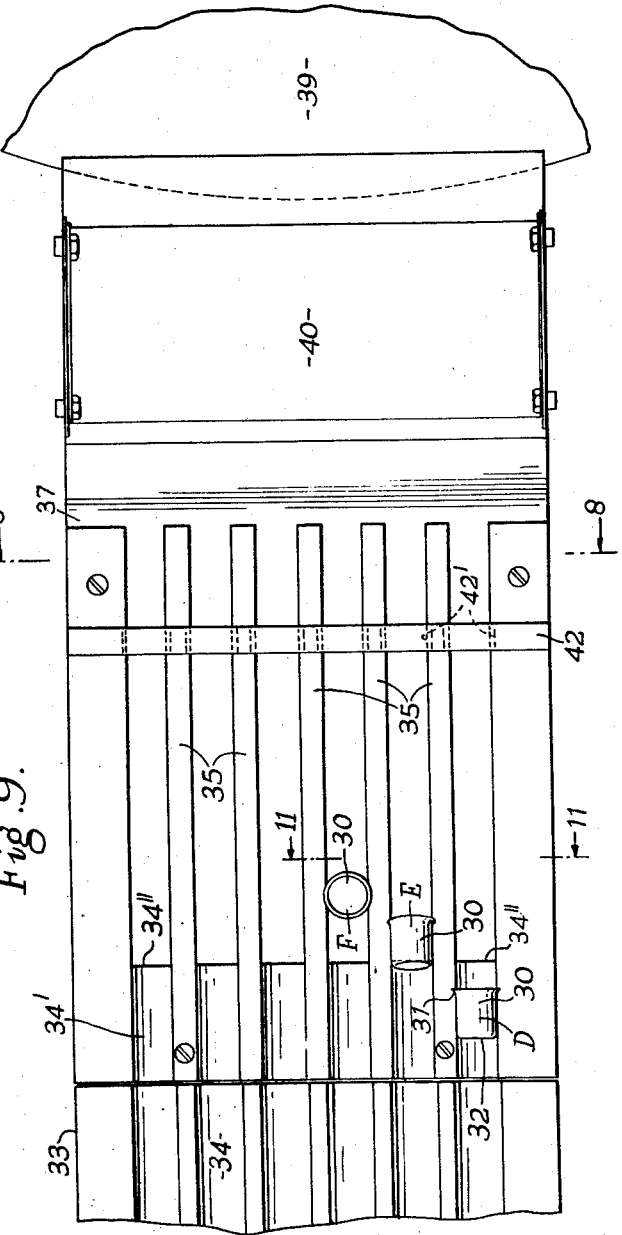

INVENTOR
EDWARD ERNEST BAILEY

ATTORNEY

United States Patent Office 2,863,552
Patented Dec. 9, 1958

2,863,552

APPARATUS FOR DELIVERING ARTICLES WITH A PREDETERMINED ORIENTATION

Edward Ernest Bailey, London, England, assignor to Lamp Presscaps Limited, London, England Application September 9, 1954, Serial No. 455,050

4 Claims. (Cl. 198—33)

The present invention relates to apparatus for delivering articles with a predetermined orientation.

Although the invention is particularly adapted for delivering lamp cap shells, it is applicable to other articles of a variety of different shapes.

In the manufacture of electric lamps it is desired to feed lamp cap shells from a hopper with a predetermined orientation: usually one in which each cap stands upon one end. The present invention has for its principal object to provide relatively simple apparatus whereby this can be done.

According to the present invention there is provided apparatus for delivering articles with a predetermined orientation comprising an elongated table inclined at a small angle downward from one end, and means for reciprocating the table in its own plane in the direction of its length, said table comprising a pair of guide rails running parallel to the length of the table and spaced apart by a distance greater than the minimum dimension of the article and less than the maximum dimension of the article.

When the article has ends of two different sizes and is required to be delivered standing upon the end of a larger size, the table further comprises, between the guide rails, means adapted to engage the article when it is in undesired orientations but not when it is in the desired orientation. The means adapted to engage the article may be constituted by the edges of apertures cut in a floor portion. Means may be provided for feeding articles automatically on to the higher end of the table and for removing the articles from the lower end of the table.

When the article is of circular cross section and has ends of two different sizes and is required to be delivered standing upon the end of smaller size, the upper end of the table may comprise a channel supporting the article with its axis approximately parallel to the direction of said reciprocation, the said guide rails being positioned at the end of the table below the said channel and to receive the article from the channel, and having between a space through which the end of the article of smaller size can fall to assume a position in which the axis of the article is substantially vertical.

Beneath, and spaced from, the guide rails, there may be provided a platform positioned to support the said end of smaller size. The lower end of this platform may be spaced further from the upper surface of the guide rails than the higher end of the platform.

The invention will be described, by way of example as applied to apparatus for delivering lamp shells, with reference to the accompanying drawings in which Figure 1 is a perspective view showing a part of apparatus according to the invention and illustrating its mode of operation, Figures 2 and 3 show modified forms of lamp cap that can be oriented with apparatus of Figure 1, Figures 4 and 5 are views in plan and side elevation respectively of one embodiment of the invention embodying the features of Figure 1, Figure 6 is a view in cross-section of the embodiment in Figures 4 and 5.

Figure 10:
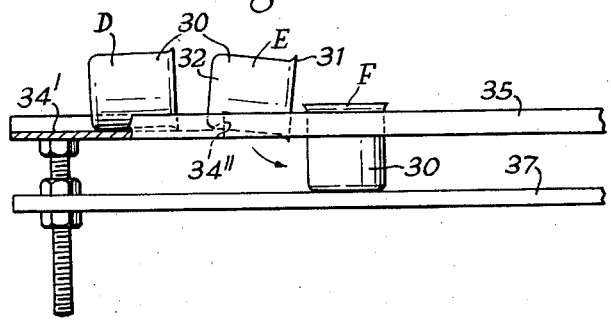
Figure 11:
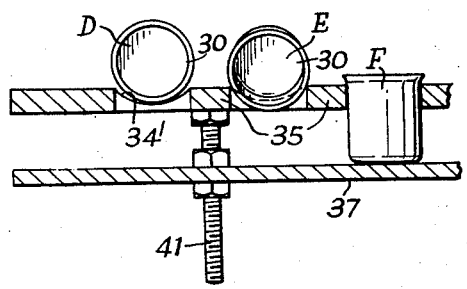

Figure 7 is a view in side elevation of part of another embodiment of the invention, Figures 8 and 9 are views in section and plan, respectively, of the embodiment in Figure 7, the section in Figure 8 being on the line 8—8 of Figure 9, Figure 10 is a diagrammatic view of part of Figure 7 illustrating the mode of operation, and Figure 11 is a view in section on the line 11—11 of Figure 9 also illustrating the mode of operation.

Referring to Figures 1 to 6, the articles to be oriented are assumed to be in the form of metal shells of circular cross-section having one end of larger diameter than the other. One example of such a shell is shown at 10 in Figure 1 and other examples are shown in Figures 2 and 3. Even when the shell is of substantially constant diameter, for example as shown in Figure 2, it usually has a chamfered end 11 which in effect constitutes an end of smaller diameter than the opposite end. It is assumed to be desired that the shells should be delivered standing upon their base of larger diameter.

As shown in Figures 4 to 6, an elongated table 12, for example of sheet iron, has a flat floor portion 13 in which are cut rectangular apertures 14. The table has six tracks, running longitudinally side by side, each defined by two guide rails 15 running along either side thereof. Thus for the six tracks there are seven guide rails. Each guide rail 15 is formed of two 15 S. W. G. wires soldered side by side to the floor portion 13. One row of the rectangular apertures 14 is provided along the centre of each track, the sides of the apertures being parallel to the guide rails, the apertures being spaced apart by about half their dimensions parallel to the guide rails, and having a transverse dimension a little less than the spacing between guide rails. The floor portion 13 is inclined at about 7° to the horizontal and the lower ends of the guide rails are bevelled off downward to a chisel edge as shown at 16 in Figures 1 and 4.

The table 12 is mounted in suitable guides 17 whereby it can be reciprocated longitudinally in the plane of the floor portion 13. For the purpose of reciprocating the table there is provided at one end a cam 18 rotated by means of an electric motor (not shown), the table having fixed thereto a cam follower roller 19 held up against the cam by means of springs 20. The stroke may for example be about 1½ inches when the table is about 28" long measured from the end 21 to the end of the furthest aperture 14 and when the number of apertures in each row is 28.

The shells to be delivered are contained in a hopper and are fed therefrom on to the higher end 21 of the table by means of an endless chain of buckets (not shown).

The guide rails of each track are spaced apart at a distance slightly less than the diameter of the end of the shell on which it is required to be delivered and slightly greater than the diameter of the opposite end of the shell. When the shell is lying on its side or standing upon its smaller diameter end, some part is engaged by an edge of an aperture in the floor of the reciprocating table and the shell is thus tossed about until it assumes the desired orientation.

This is illustrated in Figure 1 in which a part of the floor 13 of the table is shown, this table being reciprocated in the directions of the arrows 22. If a shell is in the position shown at A the smaller diameter end is engaged by one edge of an aperture 14 and the shell is tossed until owing to the reciprocation and the inclination of the table it is moved as indicated by the arrow 23 and assumes a position such as shown at B. In this position an aperture 14 engages the larger diameter end of the shell and it is again tossed about until eventually it moves say as indicated by the arrow 24 into a position as indicated at C in which it is oriented in the desired way. In this position one part of the base rests on the floor portion 13 close to one guide rail 15′ and the part of the base diametrically opposite to the first-mentioned part rests on the other guide rail 15″. The shell is thus held out of engagement with the sides of the apertures and further reciprocation of the table serves only to cause the shell to slide, in its desired orientation, to the lower end of the table where it is required to be delivered. Shells pass over the bevelled ends 16 of the guide rails and thence off the reciprocating table.

As shown in Figure 6 the table 12 preferably has side portions 25 upstanding from the floor portion, these side portions being preferably inclined outward.

The invention is applicable to articles of many different shapes, the dimensions of the apertures 14 and the spacing between the rails 15 being chosen to suit the shape and size of the articles.

By unscrewing the screws 26 the table 12 can readily be detached from its mounting and another with different dimensions of aperture or spacing of rails may be substituted.

Instead of providing apertures for engaging the articles, upstanding lugs may be used.

The embodiment shown in Figures 7 to 9 is suitable for orienting articles, such as the shells shown at 30, having a circular cross-section and one end 31 of larger diameter than the other 32. An inclined, elongated table, which may be reciprocated as described with reference to Figures 4 to 6, has at its upper end 33 a raised platform portion, on to which the articles are delivered by means not shown, this platform having channels 34. From this platform the articles pass on to a portion having a number of parallel channels 34′ of concave shape, aligned with the channels 34, which serve to orient the articles 30 and support them with their axes approximately parallel to the direction of the length of the table, as shown at D in Figures 9 and 11, between pairs of guide rails 35. If the shells are not in this attitude, the reciprocation of the table and the shape of the channels causes them to assume the attitude. In the attitude shown at D the shells 30 move to the right in Figures 7 and 9 off the channels 34′ which end at 34″. When the larger diameter end 31 is leading, a shell then assumes a position represented at E. The guide rails 35 are spaced apart by a distance less than the diameter at 31 and greater than the diameter at 32. The inwardly directed surfaces 36 (Figure 8) of the pairs of guide rails may be tapered slightly (for instance 1°) outwards and downwards. The guide rails support the large diameter ends or flanges 31 but the smaller diameter parts 32, when they pass off the edge 34″, fall between the rails so that the shells assume the position E and then position F (Figures 9 and 10). The guide rails may be supported in suitable spaced relation by a transverse strap 42, the underside of this strap being recessed as at 42′ (Figure 8) to allow the flanges 31 to pass. A platform 37 is supported beneath and spaced from the guide rails 35 by screws 41 and on this platform the smaller diameter ends of the shells can rest. As shown in Figure 10, the shell 30 in position F is standing with its end of smaller diameter resting on the platform 37, the upper flange part 31 being held clear of the guide rails 35.

If desired, however, the platform 37 may be inclined rather more than the guide rails 35 so that it is spaced from the upper surfaces of the guide rails by a slightly greater distance at the lower end than at the higher end. In this way the shells can pivot freely about their flanges and move supported only by their flanges for the earlier part of their travel along the guide rails.

In either case the shells arrive at the lower end of the guide rails supported only on their bases, or smaller diameter ends, resting on the platform 37. Here they reach a platform 38 of greater inclination along which they pass to a rotary table 39 by which they are conveyed where required. The platform 38 is hinged at 38′ to the platform 37.

In order to prevent a risk of the articles on the platform 38 overturning an adjustable cover plate 40 (Figures 7 and 9) is provided beneath which the articles slide with only small clearance.

The mode of operation of this embodiment is most clearly shown in Figures 10 and 11. In position D the article 30 is resting upon the channel 34, at E it has reached the end 34′ of the channels 34, and at F the article is supported on the guide rails 35 by its flange 31.

I claim:

1. Apparatus for delivering articles having ends of different dimensions in a desired orientation in which the articles stand upon their ends of larger dimension, said apparatus comprising an elongated table inclined at a small angle downward from one end, the table having a floor portion, a pair of guide rails upstanding from the floor portion, running parallel to the length of the table, and having between them a space less than said larger dimension, and means upon said floor portion to engage said articles in undesired orientations thereof but not in desired orientations thereof and means for reciprocating the table in its own plane in the direction of its length.

2. Apparatus according to claim 1, wherein said means to engage articles are constituted by the edges of apertures cut in the floor portion.

3. Apparatus according to claim 1, wherein said table has side portions upstanding from the floor portion and running parallel to the length of the table.

4. Apparatus according to claim 3, wherein the side portions are inclined outward.

References Cited in the file of this patent

UNITED STATES PATENTS

| 1,495,610 | Paridon | May 27, 1924 |
| 2,242,532 | Marx | May 20, 1941 |
| 2,324,246 | Thompson et al. | July 13, 1943 |
| 2,392,509 | Sells | Jan. 8, 1946 |
| 2,752,028 | Moskowitz | June 26, 1956 |
| 2,781,885 | Taylor | Feb. 19, 1957 |